(12) United States Patent
Mani

(10) Patent No.: US 8,104,804 B2
(45) Date of Patent: Jan. 31, 2012

(54) AUTOMOBILE SAFETY BUMPER ASSEMBLY

(76) Inventor: Ayyakannu Mani, Rochester Hills, MI (US)

(*) Notice: Subject to any disclaimer, the term of this patent is extended or adjusted under 35 U.S.C. 154(b) by 0 days.

(21) Appl. No.: 12/803,445

(22) Filed: Jun. 25, 2010

(65) Prior Publication Data
US 2011/0006554 A1    Jan. 13, 2011

Related U.S. Application Data

(60) Provisional application No. 61/220,231, filed on Jun. 25, 2009.

(51) Int. Cl.
*B60R 19/18* (2006.01)
(52) U.S. Cl. .................. 293/130; 296/187.04; 293/133
(58) Field of Classification Search ............ 296/187.04; 293/126, 121, 130, 133, 135, 102
See application file for complete search history.

(56) References Cited

U.S. PATENT DOCUMENTS

| | | | | | |
|---|---|---|---|---|---|
| 1,410,353 | A | * | 3/1922 | Wernig | 293/102 |
| 1,563,475 | A | * | 12/1925 | Drennan | 293/135 |
| 1,570,526 | A | * | 1/1926 | Robinson | 293/130 |
| 1,681,677 | A | * | 8/1928 | Musselman | 293/107 |
| 1,738,286 | A | * | 12/1929 | Coghlin | 293/135 |
| 2,038,964 | A | * | 4/1936 | Smith | 293/135 |
| 2,159,651 | A | * | 5/1939 | Brockett | 180/280 |
| 2,211,821 | A | * | 8/1940 | Jandus | 293/144 |
| 3,506,295 | A | * | 4/1970 | Yancey | 293/133 |
| 6,290,272 | B1 | * | 9/2001 | Braun | 293/120 |
| 6,299,227 | B1 | * | 10/2001 | Kroning et al. | 293/132 |
| 6,361,092 | B1 | * | 3/2002 | Eagle et al. | 293/102 |
| 6,443,511 | B2 | * | 9/2002 | Braun | 293/120 |
| 7,128,339 | B2 | | 10/2006 | Mani | |
| 2009/0256370 | A1 | * | 10/2009 | Siler et al. | 293/120 |

FOREIGN PATENT DOCUMENTS
JP     405032147 A  *  2/1993

* cited by examiner

*Primary Examiner* — Jason S Morrow
(74) *Attorney, Agent, or Firm* — John R. Benefiel

(57) ABSTRACT

A safety automobile bumper assembly includes energy absorbers interposed between a fascia and bumper beam comprised of a strip of deformable material formed with a loop with opposite curved ends deformed by relative movement of the fascia and bumper beam in an impact. Additional curved strip positions are provided by one or more additional loops or by one or more inner webs to increase energy absorbing capacity.

11 Claims, 5 Drawing Sheets

AUTOMOBILE SAFETY BUMPER ASSEMBLY

CROSS REFERENCE TO RELATED APPLICATIONS

This invention claims the benefit of U.S. provisional patent application No. 61/220,231 filed on Jun. 25, 2009, which is incorporated herein by reference.

BACKGROUND OF THE INVENTION

This invention concerns automobile bumpers and more particularly safety bumpers which are designed to reduce impact injuries to pedestrians struck by the bumper in an accident. It has heretofore been proposed to interpose an energy absorber in a clearance space between a back up bumper beam and a molded plastic fascia which allows the fascia to move back towards the bumper beam to crush the energy absorber, gradually absorbing the impact of the fascia with a pedestrian to greatly reduce the peak force of impact on a pedestrian's leg or other body part.

However, the clearance space available for accommodating this back movement or deflection of the fascia is quite limited. Crushable structures such as foam or structures with deformable features such as egg crate or cone constructions which have heretofore proposed are slow to begin to absorb energy, i.e., they do not offer much resistance to deformation in the initial movement.

Additionally, these structures tend to "stack up" quickly, that is to reach a point where deformation can only continue under very high crush loads.

Thus, utilization of the available space for energy absorption of such energy absorbers has been poor and have not offered good performance.

Another disadvantage is that these prior proposed absorbers are not easily "tunable", i.e., able to be modified to produce a particular desired energy dissipation curve or a desired impact force versus crush distance relationship.

Accordingly, it is an object of the present invention to provide an automobile bumper assembly having an impact safety feature which very efficiently uses a small clearance space between a bumper fascia and bumper beam to be effective in energy absorption.

It is an additional object to provide such a safety feature which can be easily tuned to create any desired energy dissipation characteristic.

SUMMARY OF THE INVENTION

These objects and other objects which will become apparent upon a reading of the following specification and claims are achieved by interposing an energy absorber comprised of a thin strip of deformable material formed into a loop having curved ends and with one or more curved interior strip walls.

One or more of the energy absorbers are interposed in clearance space between a fascia and a bumper beam therefore so that the curved end walls and interior curved strips such as webs are deformed as the fascia is pushed back towards the bumper beam by an impact. Additional loops can be nested within each other to create additional curved walls subjected to compressive bending forces increasing the energy absorbing characteristics. Holes may be formed in the end walls and/or webs to modify the crush resistance characteristics.

Nested loops can be arranged so as to cause a staged deformation of two or more curved end walls and/or webs or inner loops to create a particular crush resistance characteristic.

A series of energy absorbers may be mounted along the space between the fascia and bumper beam, with different shapes at different locations such as at the center and at corner bends of the fascia accommodating localized changes in the clearance space between the fascia and bumper beam and also to provide localized crush characteristics.

"This series of energy absorbers can be tuned to not only protect the pedestrian in a high speed (i.e., 25 mph) impact, but can also be used as energy absorbers for the low speed (i.e., 25 mph to 5 mph) barrier/pendulum impact requirements per FMVSS (Federal Motor Vehicle Safety Requirements), representing vehicle to vehicle impacts."

Alternatively, the proposed energy absorber can be used in conjunction with existing energy absorber (such as foam panels) in a side-by-side configuration, to meet the low speed and high speed impact requirements.

DESCRIPTION OF THE DRAWING FIGURES

DETAILED DESCRIPTION

In the following detailed description, certain specific terminology will be employed for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

In modern automobiles, the bumper assembly is comprised of a fascia which blends into the rest of the body, typically formed of a molded plastic.

The fascia is mounted to the body to be just formed of a bumper beam which is anchored to the body structure and designed to absorb heavier impacts.

It has been proposed to mount a crushable structure as an energy absorber interposed between the space between the fascia and bumper beam so that when a pedestrian is struck, the impact force is greatly reduced by allowing the fascia to be displaced or deflected relative to the bumper beam, this displacement resisted by deformation of interposed crushable structures.

Accordingly, to the present inventions, a series of special energy absorbers 10A, 10B, 10C are horizontally mounted interposed between the fascia 12 and mounting beam 14, preferably attached to the bumper beam 14 as by suitable fasteners or adhesive.

In a typical application, the fascia 12 has a mild break or corner on each side and housings for vehicle lights (not shown) are located at the fascia sections lying beyond the corners 18. It is typical that the fascia 12 is stiffest at these points and the clearance between the fascia 12 and mounting beam 14 is at its narrowest.

Accordingly, a relatively longer energy absorber 10B is located at the center of the fascia 12, which also is deformable more easily than the outboard located energy absorbers 10A, 10C.

Figure 3:
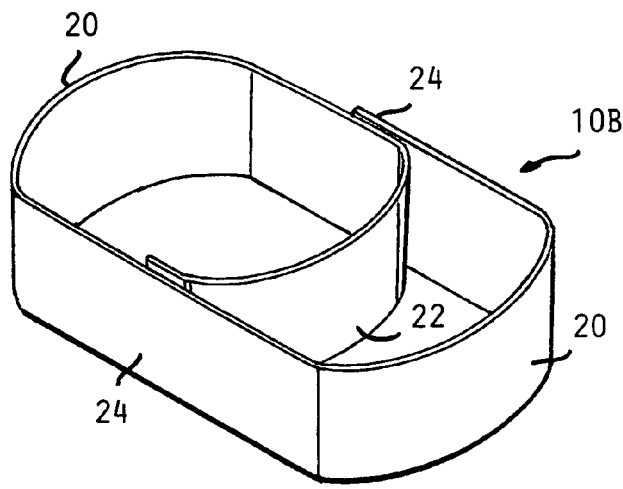
FIG. 3 is a pictorial view of one form of the energy absorbers installed between the fascia and fascia mounting beam.

The center energy absorber 10B is shown enlarged in FIG. 3 and consists a thin walled closed cell having opposite curved end walls 20 and an interior curved strip wall or web 22 connected at either end to the interior of two flat side walls 24 integral with the two end walls 20. The two flat side walls 24 are respectively abutted against the fascia 12 and bumper beam 14.

This allows the two curved end walls 20 and curved web 24 to be progressively and smoothly deformed and ultimately flattened by inelastic deformation as the two sidewalls 24 are brought closer together by relative movement of the fascia 12 and bumper beam 14 caused by absorbing the energy of an impact on the fascia.

Substantially bending begins immediately and consequently significant energy absorption begins almost immediately in contrast to other proposed structures.

The energy absorbers can be constructed of different materials, different fabrication techniques and of different sizes and wall thicknesses to be matched to a particular application.

For example, strips of 2.5 mm thick aluminum can be used. Steel and plastic will provide greater and lesser energy absorption such characteristics respectively.

The walls can be made as by bending strip material and welding the points of connection, or the shapes can be produced by extrusion of the shape without lapped and welded or glued joints as shown in FIG. 3.

The overall shape may be flat parallel sided or tapered to fit into a particular space.

Figure 4:
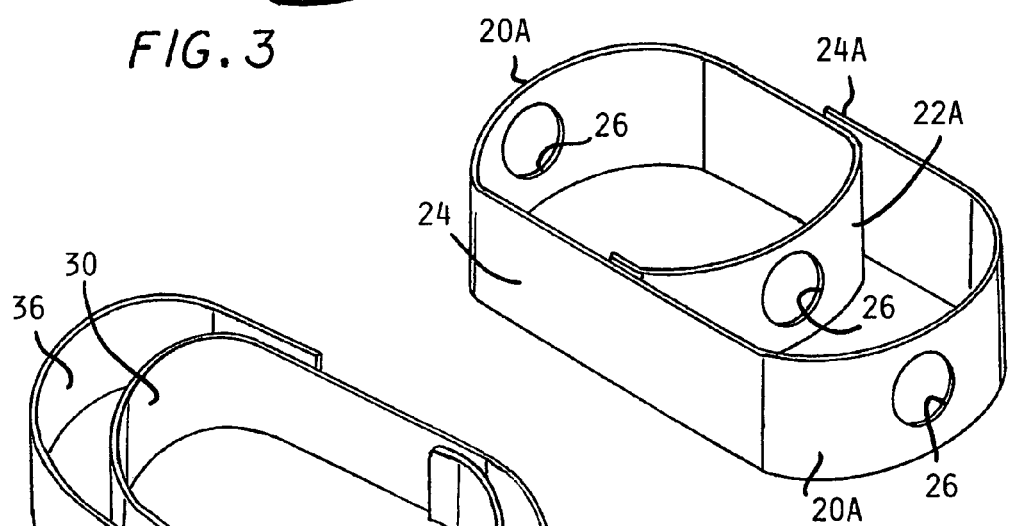
FIG. 4 is a pictorial view of another form of energy absorber utilized in the present invention.

As seen in FIG. 4, holes 26 can be added to weaken the end walls 20A or webs 22A to bending which will reduce the forces level necessary to deform the same, lowering the energy absorptive capacity of a given absorber.

Figure 1:
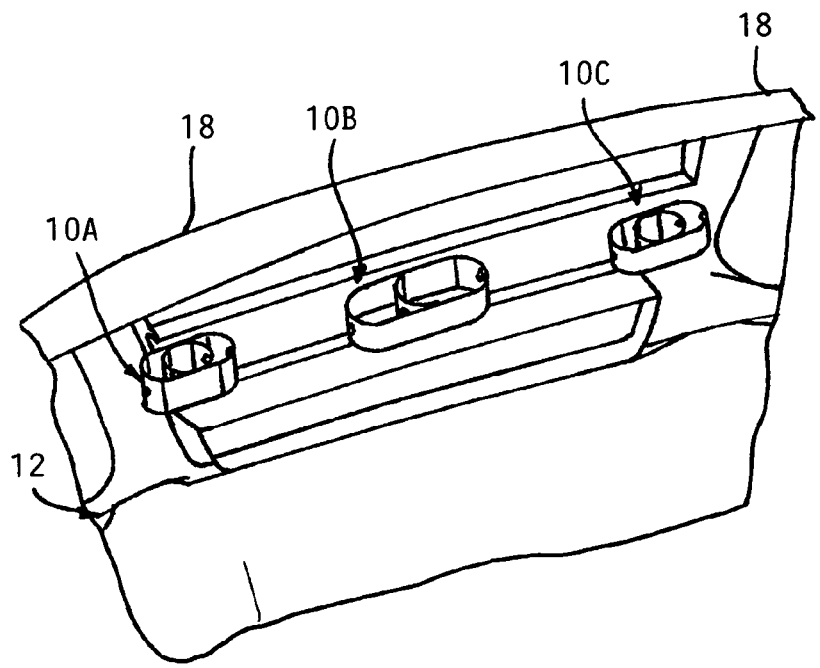
FIG. 1 is a pictorial view of an inside of a bumper fascia and showing the position of several energy absorbers relative thereto as installed according to the present invention.
Figure 2:
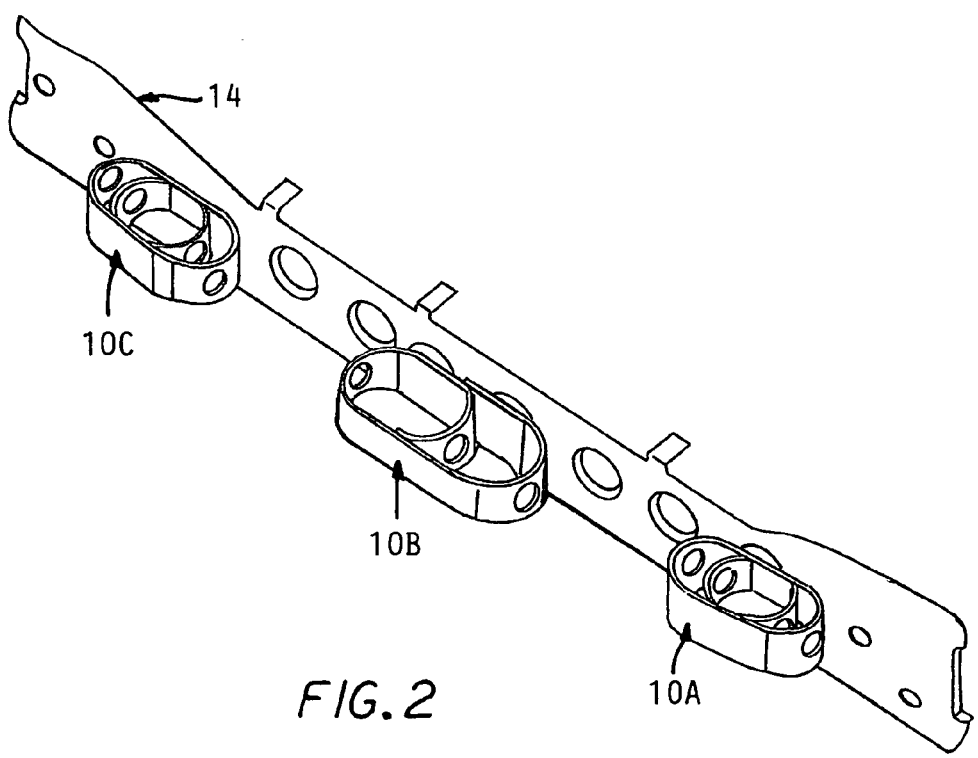
FIG. 2 is a pictorial view of a mounting beam for mounting the fascia shown in FIG. 1 having energy absorbers installed horizontally thereon in positions corresponding to FIG. 1.
Figure 5:
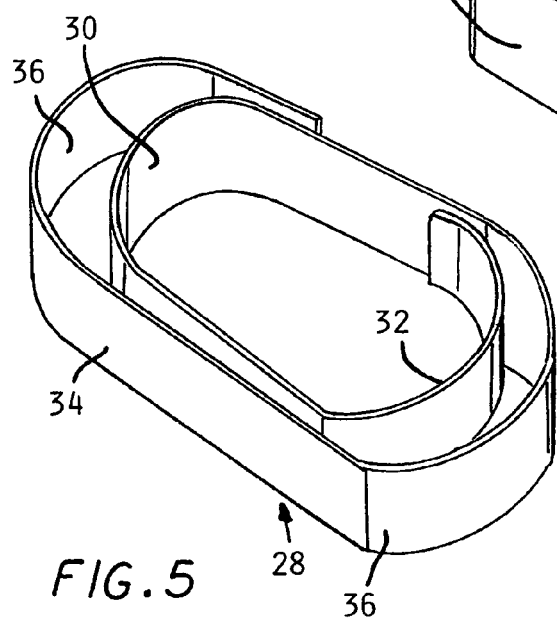
FIG. 5 is a pictorial view of yet another form of energy absorber utilized in the present invention.

FIG. 5 shows a double web energy absorber 28 such as used for the outer energy absorbers 10A, 10C of FIGS. 1 and 2.

In this configuration, two curved webs 30, 32 are connected across to the sidewalls 34, which may be generally concentric to curved end walls 36 connected between a respective ends of the sidewalls 34.

The double web increases the energy absorbing capacity by increasing the force required to collapse the absorber even while still being of the same overall size.

As seen in FIGS. 1 and 2, holes may be added to reduce the energy absorbing capacity and lower the forces required to bend and flatten together the curved ends 36 and two webs 30, 32.

Figure 6:
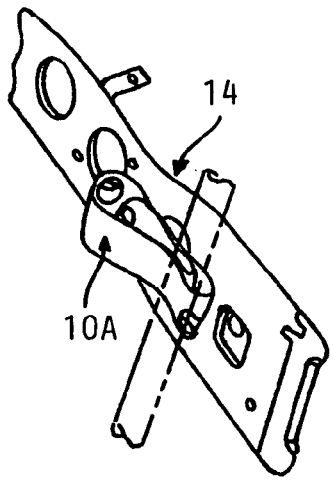
FIG. 6 is a fragmentary pictorial view of an end of a bumper fascia mounting beam having a crushed energy absorber mounted thereon.
Figure 6A:
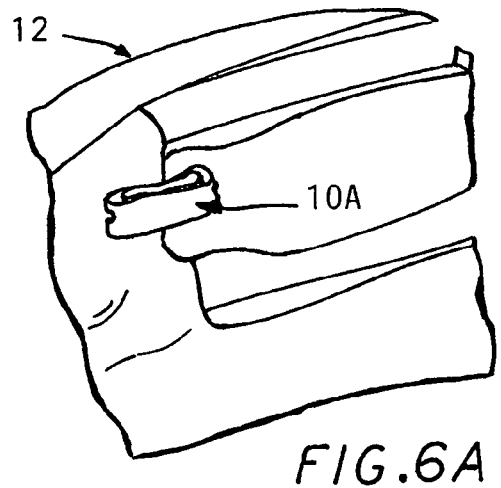
FIG. 6A is a fragmentary pictorial view of one end of the fascia showing a collapsed energy absorber in position on one end of the fascia.

A major feature of this energy absorber is its ability to be crushed to a great proportion of its starting width, i.e., even to 90% of its starting thickness as seen in FIGS. 6 and 6A wherein in a localized region the sides 34 and ends of the webs 30, 32 are brought into abutment in the fully deformed state.

The bending force does not increase substantially from the beginning to the end of the deformation process unlike other such crush structures proposed for bumper safety arrangements.

As can be seen from FIGS. 6 and 6A, the energy absorber can be flattened down to the metal thickness, from the original configuration shown in FIG. 2. For example, if strips of 1 mm thickness is used in the energy absorber initial width is 50 mm, and if the 46 mm of crush can be obtained with 4 mm used up in the four metal strips stacked upon each other. Currently, available energy absorbers do not provide this much of usable crush space.

Figure 7:
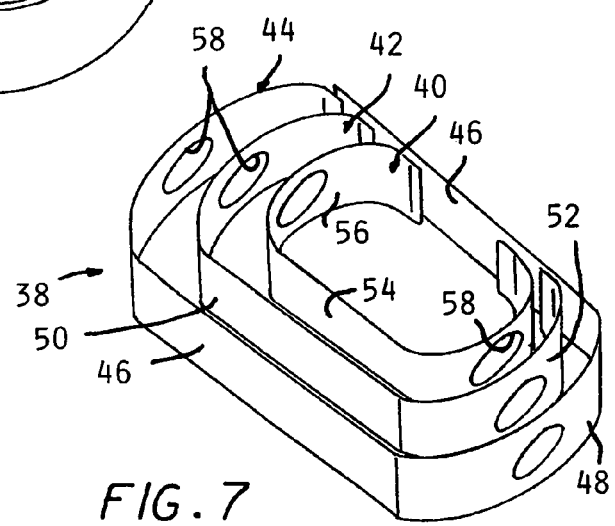
FIG. 7 is another form of energy absorber utilized by the present invention.

FIG. 7 shows another version of energy absorber 38 including nested triple loops 40, 42, 44 formed by being connected to one side 46 of the outermost loop element 44.

This creates a common side of the inner elements 40, 42 by closing the loop of the inner elements 40, 42.

This arrangement creates a three stage deformation process as initially only the outer loop ends 48 of outer loop element 44 are deformed when the sides 46 are compressed towards each other.

After the straight side 46 contacts the unattached straight side 50 of the next loop 42, deformation of the curved ends 52 of loop 42 begins along with continued deformation of the curved ends 54 of loop element 44.

This increases the energy absorption since both sets of curved ends 48, 52 are thereafter deformed.

Finally, the straight side 50 contacts straight side 54 of the innermost loop 40 and its curved ends 56 also begin to be deformed, adding the energy absorbing capacity provided by the necessary force to carry out that deformation.

Holes 58 can be provided in the ends of one or more curved ends 48, 52, 56 as necessary to achieve a desired energy absorption characteristic. Thus, the offset nesting of the series of loop elements 40, 42, 44 creates a progressive stage process of deforming each set of curved ends 48, 52, 56.

Figure 8:
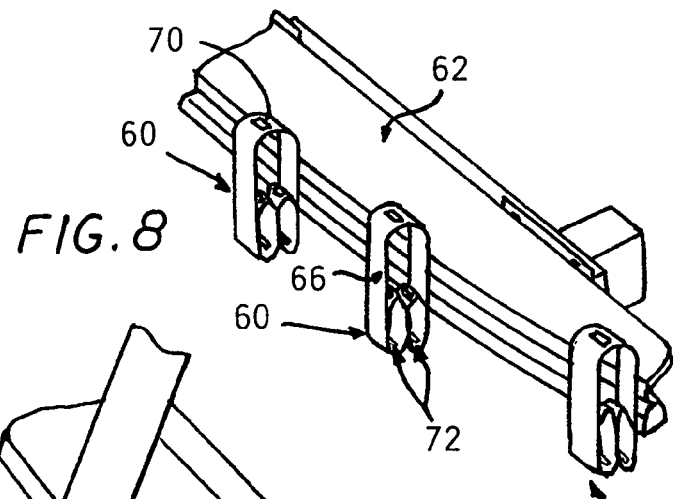
FIG. 8 is a pictorial view of a bumper beam having an array of energy absorbers mounted thereto in an alternate vertical orientation.
Figure 8A:
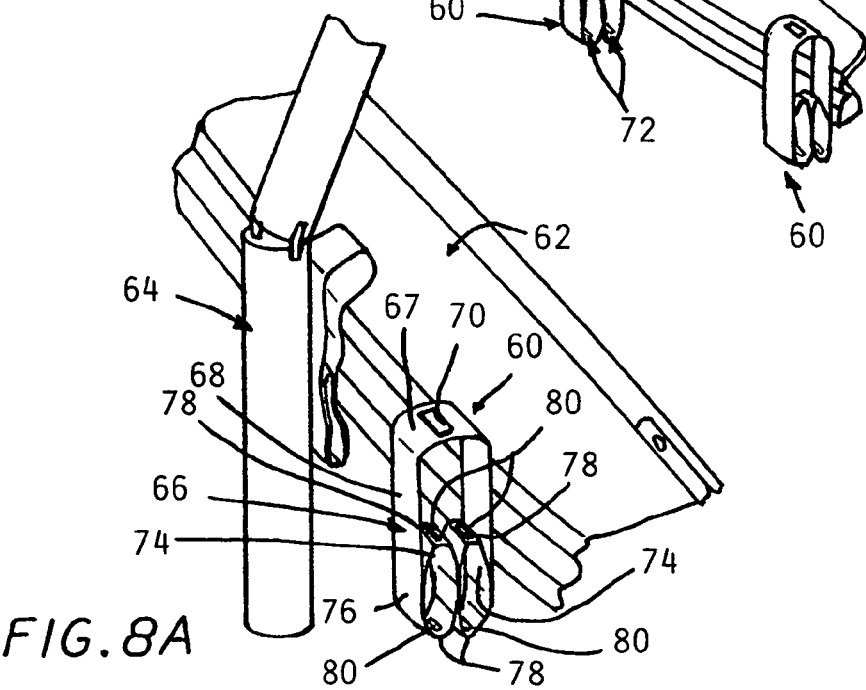
FIG. 8A is an enlarged fragmentary view of the beam shown in FIG. 8 showing one of the energy absorbers crushed by impact of a diagrammatically depicted impacted structure.

FIGS. 8 and 8A depict a vertical orientation of a series of another form of triple loop energy absorbers 60 vertically mounted along a bumper beam 62. This more nearly aligns the energy absorbers long dimension with the leg of a pedestrian, represented by articulated cylinder 64 (FIG. 8A).

The energy absorbers 60 are comprised of outer loops 66 having a curved upper end 67 (which may have a slot opening 70).

Opposite flat straight sides 68 extend down into respective side by side inner loops 72 formed within the lower ends of the sides 68. The inner loops 22 each have inner flat straight sides 74 (which may be provide by a common strip) and outer straight sides 76 which may be formed by lower parts of the straight sides 68 of the outer loop element 66.

Curved ends 78 are formed on each of the inner loop elements 72 (which may have slot openings 80 formed therein).

All of the curved ends 78 are simultaneously deformed when the sides 68, 74, 76 are compressed together providing a unique energy absorbing characteristic.

The inner loop elements 72 are aligned over the mounting beam 62 to be more completely flattened by a leg as seen in FIG. 8A.

The fascia is not shown but would be directly contacted by a pedestrian's leg in the event of an accident, the fascia readily deflecting to transmit the contact pressure on to one of the energy absorbers 60. It should be understood that the leg would not necessarily be aligned with an individual absorber 60 as shown but could be somewhat offset. The deformation effect would be similar.

Thus, the energy absorbing resistance would be concentrated in the lower area which is backed up by the bumper beam 62.

Figure 9:
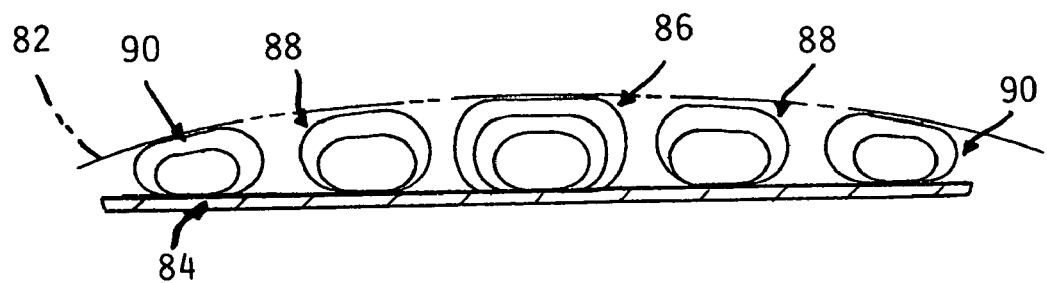
FIG. 9 is a diagrammatic plan view of a bumper beam having a plurality of energy absorbers installed therebetween.

FIG. 9 is a diagram of another arrangement of energy absorbers located between an outer fascia 82 and a bumper beam 84.

These include a triple nested loop energy absorber 86, smaller intermediate double loop energy absorbers 88, one on either side of the center energy absorber 86, and end smaller double loop energy absorbers 90.

The energy absorbers 86, 88, 90 are shaped and sized to fit within the varying clearance space between the fascia and the bumper beam 84.

Figure 10:
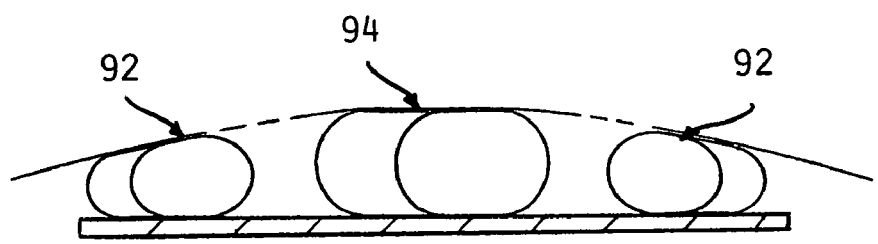
FIGS. 10-12 are diagrammatic plan views of the mounting of FIG. 9 with various alternate arrangements of energy absorbers installed therein.

FIG. 10 shown a set of three energy absorbers, two tapered inner curved web absorbers 92 and a single large center curved inner web absorber 94.

Figure 11:
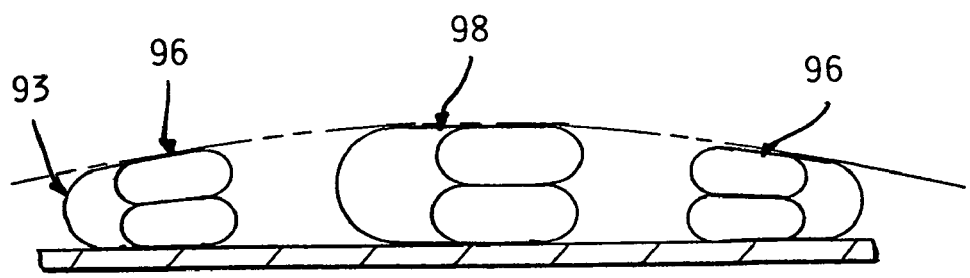

FIG. 11 shows three loops within a large loop 93, two small double loop end absorbers 96 and a large centered absorber 98.

Figure 12:
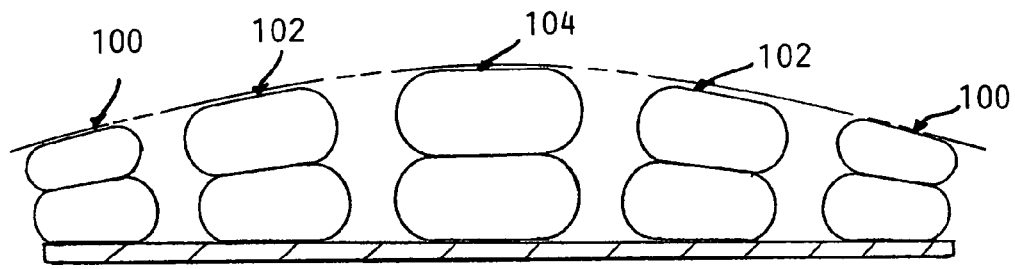

FIG. 12 shows five double loop energy absorbers, two end absorbers 100, two larger intermediate absorbers 102, and a single larger absorber 14.

Figure 13:
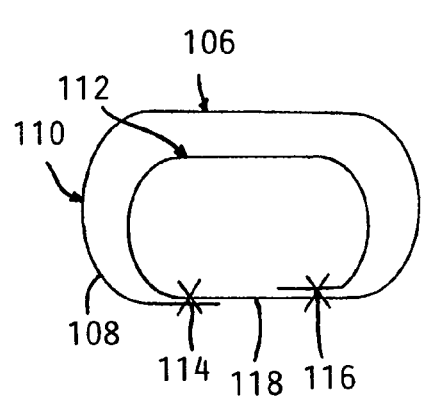
FIG. 13 is a plan view of a double loop energy absorber formed from a single strip of material.

FIG. 13 shows a double loop energy absorber 106 in which a spiraled single strip 108 forms a pair of loops, an outer loop 110 and an inner loop 112, with a first outer attachment 114 and a second inner attachment 116. The outer end of the strip 108 to attach to the outside of a common straight side 118 segment with attachment 114, the inner end of the strip 108 connected to inside of the straight side 118 with attachment 116.

Figure 14:
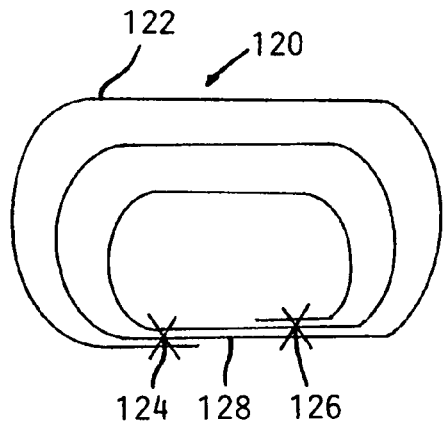
FIG. 14 is a plan view of a triple loop energy absorber formed from a single strip of material.
Figure 15:
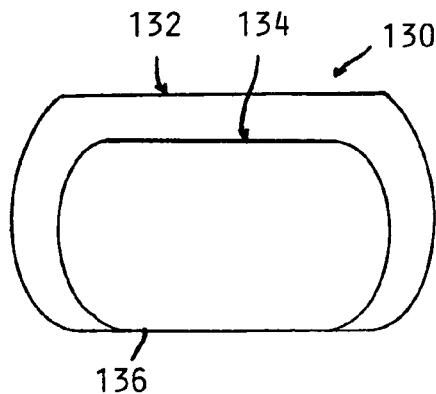
FIG. 15 is a plan view of an extruded or molded form of double loop energy absorber.

FIG. 14 shows a triple loop energy absorber 120 also formed with a spiraled single strip 122 connected at either end 124, 126 to a doubled straight side segment 128. FIG. 15 shows a double loop energy absorber 130 for inclusion in a safety bumper assembly made by an extrusion process where two loops 132, 134 are formed together with a common side 136 by an extrusion process. A molding or casting process could also be used.

Figure 16:
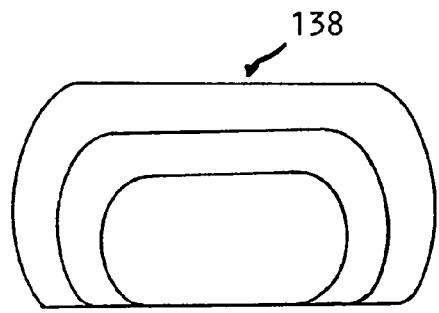
FIG. 16 is a plan view of an extruded or molded form of a triple loop energy absorber.

FIG. 16 shows a triple loop energy absorber 138 for safety bumper assembly made by the same process.

Accordingly, a much improved safety bumper may be provided as described overcoming the limitations of the prior designs and proposals.

The invention claimed is:

1. An automobile safety bumper assembly providing for enhanced energy absorption to protect a pedestrian against injury by impact of said bumper assembly, said safety bumper assembly comprising:
a fascia;
a bumper beam aligned with said fascia with a clearance space therebetween, said bumper beam adapted to be mounted to be fixedly anchored;
one or more energy absorbers mounted in said clearance space; said one or more energy absorbers each comprising a deformable strip forming an outer loop having opposite sides respectively engaged by said fascia and said mounting beam and curved ends deformed by said fascia and bumper beam when relatively moved closer together as by an impact of said fascia with a separate body;
one or more interior curved strip walls lying within said outer loop, said curved strip wall also deformed by said relative movement of said fascia and bumper beam;
said one or more internal curved strip walls including a first inner loop within said outer loop and a second inner loop lying within said first inner loop and having curved ends compressed by continued relative movement of said fascia and bumper beam towards each other.

2. The safety bumper assembly according to claim 1 wherein said one or more inner curved walls include one or more inner curved webs extending between and connected to said opposite sides and also deformed by said relative movement of said fascia and bumper beam.

3. The safety bumper assembly according to claim 2 including multiple curved webs extending between said two opposite sides.

4. The safety bumper assembly according to claim 1 further including an opening formed in said curved ends and/or said interior curved strip walls to reduce the resistance to bending thereof.

5. The safety bumper assembly according to claim 4 wherein said first inner loop is adjacent one of said opposite sides of said outer loop.

6. The safety bumper assembly according to claim 5 wherein said first inner loop is formed in part by one of said opposite sides of said outer loop.

7. The safety bumper assembly according to claim 6 wherein said first inner loop is formed as a part of a continuous strip also forming said outer loop.

8. The safety bumper assembly according to claim 1 wherein a plurality of energy absorbers are mounted along said clearance space.

9. A method of providing an impact absorption capability to a bumper assembly comprised of a relatively moveable fascia and a bumper beam having a clearance space therebetween, comprising: constructing one or more energy absorbers by winding a continuous strip of bendable sheet material to form an inner elongated curved loop, and then into an at least partially surrounding elongated smoothly curved outer partial or complete elongated loop, each of said elongated loops having curved ends and flattened sides with an inner end of said strip attached to a flattened side of said inner or outer loop and an outer end of said strip attached to a flattened side of said inner or outer loops;
mounting said energy absorber in said clearance space with opposite sides of said outer loop engaged by said fascia and bumper beam respectively so as to progressively deform said inner and outer loop curved ends by said relative movement, said bumper thereby able to absorb impacts.

10. The method according to claim 9 wherein adjacent curved ends of said loops are formed so that each are spaced apart from each other.

11. The method according to claim 9 wherein said flattened sides of each loop are formed to be spaced from each other.

\* \* \* \* \*